United States Patent Office 3,758,419
Patented Sept. 11, 1973

3,758,419
CLEANSING AND LAUNDERING COMPOSITIONS
James W. Hayden, Richmond, Roy T. Holm, Orinda, and Rupert C. Morris, Berkeley, Calif., assignors to Shell Oil Company, New York, N.Y.
No drawing. Continuation-in-part of applications Ser. No. 138,376, Ser. No. 138,377, and Ser. No. 138,378, all Apr. 28, 1971. This application June 3, 1971, Ser. No. 149,799
Int. Cl. C11d 1/08, 1/22
U.S. Cl. 252—551
28 Claims

ABSTRACT OF THE DISCLOSURE

Biodegradable detergent formulations contain as builders water soluble polycarboxylate telomers terminated with certain oxygenated end groups.

This application is a continuation-in-part of copending applications Ser. No. 138,378, filed Apr. 28, 1971, Ser. No. 138,376, filed Apr. 28, 1971, and Ser. No. 138,377, filed Apr. 28, 1971.

BACKGROUND OF THE INVENTION

Some materials are known to possess the property of improving the detergency levels of soaps and synthetic detergents. Such cleaning boosters are called "builders." The most widely used builders are pyrophosphates and polyphosphates. However, the wide-spread use of phosphate builders in detergents has contributed significantly to the pollution of rivers and lakes into which the sewage effluent is emptied. Such pollution of rivers and lakes results in increasing the growth of algae as well as over-fertilization of the water (eutrophication).

Numerous builder materials have been considered as substitutes for phosphate builders in order to reduce the pollution caused by phosphates. However, despite considerable research, suitable non-polluting, biodegradable substitutes for phosphates are not available. For example, the use of nitriloacetate salts, a widely used phosphate substitute, has recently been discontinued because of serious ecological and health side e:ects. (See, Chemical Week, July 15, 1970, pp. 23–24; Chemical and Engineering News, Jan. 4, 1971, pp. 15–16; and Chemical Week, Jan. 6, 1971; p. 11.) Similarly, polyelectrolyte builders, such as those disclosed in U.S. Pat. 3,308,067, issued to F. L. Diehl on Mar. 7, 1967, have been found, after a tremendous amount of research, to be non-biodegradable and therefore unsuitable substitutes for phosphate builders. The problems associated with attempts to develop a biodegradable polyelectrolyte builder are reported in Chemical Week, Feb. 17, 1971, pp. 41–43.

SUMMARY OF THE INVENTION

It has now been found that water-soluble, essentially biodegradable polycarboxylate telomers having certain oxygenated end groups and meeting certain requirements as to molecular weight and $Ca^{++}$ sequestering ability possess excellent builder properties and are capable of enhancing the detergency levels of a broad spectrum of detergent surfactants.

DESCRIPTION OF PREFERRED EMBODIMENT

Polycarboxylate Telomer Builders: The builder components of the detergent and cleaning formulations of the invention are water-soluble, substantially biodegradable polycarboxylate telomers represented by the Formula I

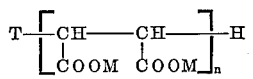
(I)

wherein M is ammonium or an alkali metal, preferably sodium or potassium; n is a whole number from 2 to 40, preferably 3 to 30 and more preferably from 3 to 15; and T is an oxygenated end group selected from $(A')(R)CH—(A)C(R)—$, $B[C(R)_2]_m$ or $(R)C(B')_2—$ where m is one or two; R independently is hydrogen or alkyl of 1 to 4 carbon atoms and free from quaternary carbon atoms, i.e., alkyl of 1 to 4 non-quaternary carbon atoms such as methyl, ethyl, n-propyl, isopropyl, n-butyl or isobutyl; A is hydroxyl; A' is A or hydrogen; B is alkanoyl of 2 to 6 carbon atoms, preferably n-alkanoyl; and B' is B or —COOM.

Suitable water-soluble polycarboxylate telomer builder components of Formula I are disclosed in several co-pending applications. The telomer builder components of Formula I wherein T is $(A')(R)CH—(A)C(R)—$, i.e., telomers of the Formula II

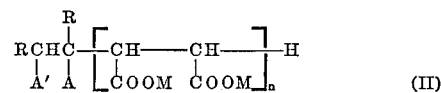
(II)

wherein R, A, A', M and n have the same significance as defined in Formula I, are described in applicants' copending application Ser. No. 138,376, common assignee, filed Aug. 28, 1971. The telomer builder components of Formula I wherein T is $B[C(R)_2]_m$, i.e., telomers of the Formula III

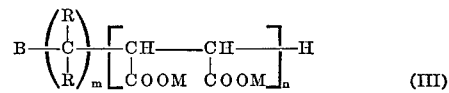
(III)

wherein R, B, M, m and n have the same significance as defined in Formula I, are described in applicants' copending application Ser. No. 138,378, common assignee, filed Apr. 28, 1971. The telomer builder components of Formula I wherein T is $(R)(C(B')_2—$, i.e. telomers of the Formula IV

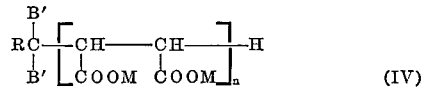
(IV)

wherein R, B', M and n have the same significance as defined in Formula I, are described in applicants' copending application Ser. No. 138,377, common assignee, filed Apr. 28, 1971. The disclosures of these copending applications are herewith incorporated by reference.

Preferred telomers of Formula I are those wherein the T end group is free of quaternary carbon atoms and R is hydrogen or n-alkyl, especially methyl. Hydroxylalkyl terminated telomers of Formula II are preferred over the alkanoyl and/or carboxylate terminated telomers of Formula III and IV, and particularly preferred telomers of Formula II are those wherein A' is hydroxyl.

The term n in Formulas I to IV represents the number of taxogen units per telogen unit in the telomer molecule, (i.e., the degree of telomerization). The telomer builders are therefore in reality a mixture of telomers having 2 to 40 molecules of taxogen per molecule of telogen. However, although the mixture of telomers on occasion contains individual telomers molecules which have molecular weights up to about 4000 (e.g., when n=40), the entire telomer builder mixture (calculated as the acid form) has a number-average molecular weight (as determined by vapor pressure osmometry) of less than 1,200, preferably less than 1000. Generally, the number-average molecular weight of the telomer mixture (calculated as acid form) varies from 300 to 1200, preferably from 300 to 1000, more preferably from 500 to 800.

As heretofore indicated, the telomers of Formulas II and III having the lower degrees of telomerization (i.e., $n$ of 3 to 30 or 3 to 15) and therefore narrower molecular weight distributions are preferred formulation components of the invention. Such telomers of narrower molecular weight distribution are preferred largely because the water-soluble salts are generally more biodegradable. In general, the telomer builders are at least 70% biodegradable, typically are at least 80% biodegradable and occasionally are at least 90% biodegradable.

The water-soluble polycarboxylate telomers of Formulas I to IV have a $Ca^{++}$ sequestering ability of about 1 to 15 g. $Ca^{++}/100$ g., although a $Ca^{++}$ sequestering ability of about 3 to 12 g. $Ca^{++}/100$ g. is preferred.

Detergent surfactant.—According to this invention extraordinary cleaning results can be obtained by using the above polycarboxylate telomer builders with a wide range of active detergent surface active materials and mixtures thereof. The telomer builders are effective when used singly or mixtures thereof can be used.

In general, in the detergent compositions of this invention, the essential ingredients are (a) an organic water-soluble detergent surface active material as defined and illustrated below and (b) a polycarboxylate telomer builder meeting the structural requirements specified and exemplified above. The detergent compositions of this invention contain the essential ingredients in a weight ratio of polycarboxylate telomer builder to detergent surfactant in the range of about 1:3 to about 10:1 with such compositions providing in aqueous solution a pH of about 8.5 to about 12. The preferred weight ratio of polycarboxylate telomer builder to detergent surfactant is about 1:2 to about 8:1, more preferably about 1:2 to 5:1, and the optimum pH range is 8.5 to about 11.

The detergent surface active compounds which can be used within the compositions of this invention include substantially biodegradable anionic, nonionic, zwitterionic, ampholytic detergent compounds and mixtures thereof.

(A) Anionic detergent compositions which can be used in the compositions of this invention include both soap and non-soap detergent compounds.

Examples of suitable soaps are the sodium, potassium, ammonium and alkylolammonium salts of higher fatty acids ($C_{10}$–$C_{20}$). Particularly useful are the sodium or potassium salts of the mixtures of fatty acids derived from coconut oil and tallow, i.e., sodium or potassium tallow and coconut soap.

Examples of anionic organic non-soap detergent compounds include:

(1) Water-soluble, alkali metal, preferably sodium or potassium, alkyl sulfates obtained by sulfating $C_8$–$C_{18}$ alcohols e.g., alcohols produced by reducing the glycerides of tallow or coconut oil or synthetic alcohols produced by the hydroformylation of olefins as disclosed in U.S. 3,420,898 and U.S. 3,344,291.

(2) Alkali metal alkylbenzene sulfonates in which the alkyl radical is a straight chain aliphatic radical containing from about 10 to about 20 carbon atoms, for instance, 2-phenyldodecanesulfonate and 3-phenyl-dodecanesulfonate;

(3) Alkyl glyceryl ether sulfonate detergent having a straight chain alkyl group of from about 10 to about 14 carbon atoms, the cation of said sulfonate being selected from the group of monoethanolamine, diethanolamine, triethanolamine, ammonium sodium, and potassium, and mixtures thereof. Preferably, the alkyl group should contain 12 carbon atoms or be comprised of mixtures of chain lengths averaging 12 carbon atoms. One preferred embodiment is having the alkyl group being derived from coconut alcohol and especially the middle-cut coconut alcohol containing 2%w. $C_{10}$, 66%w. $C_{12}$, 23%w. $C_{14}$, and 9%w. $C_{16}$. Other illustrative examples are sodium decyl glyceryl ether sulfonate, sodium dodecyl glyceryl ether sulfonate, sodium tetradecyl glyceryl ether sulfonate, and the corresponding potassium salts. Mixtures of such compounds can also be used. The alkyl groups can be obtained from synthetic as well as natural sources, e.g., coconut alcohols, and the like.

(4) $C_{10}$–$C_{26}$ alpha-olefin sulfonates, preferably $C_{14}$–$C_{20}$, produced by reacting alpha-olefin hydrocarbons ($C_{10}$–$C_{26}$) with sulfur trioxide as disclosed, for example, in U.S. Pat. 3,488,384, issued to Kessler et al. on Jan. 6, 1970. Suitable alpha-olefin sulfonates are the anionic alkali metal salts and include those disclosed in U.S. Pat. 3,332,877. Preferred alpha-olefin sulfonates are those produced from $C_{14}$–$C_{20}$ linear alpha-olefins.

(5) Alkali metal sulfuric acid ester of an alcohol ethoxylate (alcohol ethoxysulfates) containing from about 10 to about 15 carbon atoms in the alkyl portion, and from 1 to about 15 moles of ethylene oxide, and represented by the formula $R'(OC_2H_4)_ySO_4M'$ wherein $R'$ represents an alkyl radical containing from about 10 to about 15 carbon atoms, preferably at least 70% linear, and $y$ ranges from 1 to about 15. $M'$ represents any cation which forms a water soluble salt but preferably sodium, potassium, ammonium and substituted ammonium salts. The alkyl radical can be derived from a natural source such as the middle-cut of distilled coconut fatty alcohol which consists of a mixture of various chain lengths being approximately 2%w. $C_{10}$, 66%w. $C_{12}$, 23%w. $C_{14}$, and 9%w. $C_{16}$, or from $C_{10}$–$C_{15}$ synthetic alcohols produced by the hydroformylation of olefins as disclosed in U.S. 3,420,898 and U.S. 3,344,291.

(6) Alkali metal n-alkane sulfonates, preferably sodium n-alkane sulfonates, wherein the alkyl group contains 10 to 20 carbon atoms, preferably 14 to 18 carbon atoms, produced, for example, by the sulfoxidation of normal paraffins as disclosed in Netherlands patent applications 6514137 and 6604382 of Farbwerke Hoechst.

(7) Other suitable synthetic anionic surfactants include: sodium coconut oil fatty acid monoglyceride sulfates and sulfonates; sodium or potassium salts of alkylphenyl ethylene oxide ether sulfate with about 1 to about 10 units of ethylene oxide per molecule and in which the alkyl radical is an essentially straight chain radical containing about 9 to about 15 carbon atoms; the reaction product of fatty acids esterified with isethionic acid and neutralized with sodium hydroxide where, for example, the fatty acids are derived from coconut oil; sodium or potassium salts of fatty acid amide of a methyl tauride in which the fatty acids, for example, are derived from coconut oil; and others known in the art, a number being specifically set forth in U.S. Pats. Nos. 2,486,921, 2,486,922 and 2,396,278.

(b) Nonionic synthetic detergents may be broadly defined as compound aliphatic or alkylaromatic in nature which do not ionize in water solution. For example, a well known class of nonionic synthetic detergents is made available on the market under the trade name of "Pluronic." These compounds are formed by condensing ethylene oxide with an hydrophobic base formed by the condensation of propylene oxide with polypropylene glycol. The hydrophobic portion of the molecule which, of course, exhibits water insolubility has a molecular weight of from about 1,500 to 1,800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkyl phenols, e.g., the condensation products of alkyl phenols having an alkyl group containing from about 6 to 12 carbon atoms in essentially straight chain configuration, with ethylene oxide, the ethylene oxide being present in amounts equal to 10 to 25 moles of ethylene oxide per mole of alkyl phenol.

(2) Nonionic detergents derived from the condensation of ethylene oxide with the product resulting from the reaction of propylene oxide and ethylenediamine. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamines and excess propylene oxide, the hydrophobic base having a molecular weight of the order of 2,500 to 3,000, are satisfactory.

(3) $C_{10}$–$C_{18}$ alcohol ethoxylates, i.e., the condensation product of aliphatic alcohols having from 8 to 18 carbon atoms, in either straight chain or essentially straight chain configuration, with from 5 to 30 moles of ethylene oxide, e.g., a coconut alcohol-ethylene oxide condensate having from 10 to 30 moles of ethylene oxide per mole of coconut alcohol fraction or ethoxylates of synthetic alcohols produced by the hydroformylation of olefins as disclosed in U.S. Pats. 3,420,898 and 3,344,291.

(4) Long chain tertiary amine oxides corresponding to the following general formula, $R_1R_2R_3N \rightarrow O$, wherein $R_1$ is an alkyl radical of from about 8 to 18 carbon atoms, and $R_2$ and $R_3$ are each methyl or ethyl radicals. The arrow in the formula is a conventional representation of a semi-polar bond. Examples of amine oxides suitable for use in this invention include dimethyldodecylamine oxide, dimethyloctylamine oxide, dimethyldecylamine oxide, dimethyltetradecylamine oxide, dimethylhexadecylamine oxide.

(5) Dialkyl sulfoxides corresponding to the following formula, $R_7R_8S \rightarrow O$, wherein $R_7$ is an alkyl, alkenyl, beta- or gamma-monohydroxyalkyl radical or an alkyl or beta- or gamma-monohydroxyalkyl radical containing one or two other oxygen atoms in the chain, the $R_7$ groups ranging from 10 to 18 carbon atoms in chain length, and wherein $R_8$ is methyl or ethyl. Examples of suitable sulfoxide compounds are:

dodecyl methyl sulfoxide
tetradecyl methyl sulfoxide
3-hydroxytridecyl methyl sulfoxide
2-hydroxydodecyl methyl sulfoxide
3-hydroxy-4-decoxybutyl methyl sulfoxide
3-hydroxy-4-dodecoxybutyl methyl sulfoxide
2-hydroxy-3-decoxypropyl methyl sulfoxide
2-hydroxy-3-dodecoxypropyl methyl sulfoxide
dodecyl ethyl sulfoxide
2-hydroxydodecyl ethyl sulfoxide.

(6) Fatty acid amide selected from the group consisting of fatty acid monoethanolamide, fatty acid monoisopropanolamide, and fatty acid glycerylamide. Mixtures of these compounds can also be used. The fatty acid group should contain from 10 to 14 carbon atoms and be obtained from natural or synthetic sources. Preferably, the fatty acid group should contain 12 carbon atoms, or if compounds having mixed chain lengths are used, they should contain an average of 12 carbon atoms. An example of the latter is a coconut alkyl group obtained from the middle-cut of distilled coconut fatty acid which consists of a mixture of various chain lengths being approximately 2%w. $C_{10}$, 66%w. $C_{12}$, 23%w. $C_{14}$, and 9%w. $C_{16}$. Other examples are decyl monoethanolamide, dodecyl monoethanolamide, and tetradecyl monoethanolamide. The corresponding chain lengths of isopropanolamide and glycerylamide are also useful, as are mixtures of these compounds.

(c) Ampholytic synthetic detergents can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group. Examples of compounds falling within this definition are sodium-3-dodecylaminopropionate and sodium-3-dodecylaminopropanesulfonate.

(d) Zwitterionic synthetic detergents can be broadly described as derivatives of aliphatic quaternary ammonium compounds in which the aliphatic radical may be straight chain or branched and wherein one of the aliphatic substituents contains from about 8 to 18 carbon atoms and one contains an anionic water solubilizing group. Examples of compounds falling within this definition are 3 - (N,N - dimethyl - N - hexadecylammonio) propane - 1 - sulfonate and 3 - (N,N - dimethyl-N-hexadecylammonio) - 2 - hydroxypropane - 1 - sulfonate which are especially preferred for their excellent cool water detergency characteristics. Other suitable aliphatic quaternary ammonium compounds are those disclosed in U.S. Pat. 3,332,877, issued to Reuland et al. on July 25, 1967.

The anionic, nonionic, ampholytic and zwitterionic detergent surfactants mentioned above can be used singly or in combination in the practice of the present invention. The above examples are merely specific illustrations of the numerous detergents which can find application within the scope of this invention.

Preferred detergent surfactants are those which are essentially 100% biodegradable, e.g., surfactants which are free of quaternary carbon atoms and aromatic rings. Particularly preferred surfactants are alcohol ethoxylates, alkali metal salts of alcohol ethoxysulfates and linear alpha-olefin sulfonates.

The foregoing organic detergent surfactant compounds can be formulated into any of the several commercially desirable composition forms, for example, flake, liquid and tablet forms.

The detergent compositions described by this invention employing a polycarboxylate telomer builder compound as defined above can have special applicability in the area of built liquid detergents. Most of the built liquid detergents commercially available at the present time are either water based or have a mixture of water and alcohol as the liquid vehicle. Accordingly, a built detergent composition of this invention can consist essentially of a polycarboxylate telomer builder as defined herein and an organic detergent surfactant in the weight ratios described above and the balance being a vehicle medium, for example, water, a water-alcohol mixture, liquid nonionic surfactant compounds, etc.

Aqueous solutions of the detergent compositions of the invention suitably used for detergent applications generally contain 0.05%w. to 0.5%w. of the detergent compositions.

Detergent additives.—In a finished detergent formulation of this invention there will often be added in minor amounts materials which make the product more effective or more attractive. The following are mentioned by way of example. Soluble sodium carboxymethylcellulose can be added in minor amounts to inhibit soil redeposition. A tarnish inhibitor such as benzotriazole or ethylenethiourea can also be added in amounts up to about 2%. Fluorescers, perfume and color, while not essential in the compositions of the invention, can be added in amounts up to about 1%. An alkaline material or alkali such as sodium hydroxide or potassium hydroxide can be added in minor amounts as supplementary pH adjusters. There might also be mentioned as suitable additives, water, brightening agents, bleaching agents, sodium sulfate, and sodium carbonate.

Corrosion inhibitors generally are also added. Soluble silicates are highly effective inhibitors and can be added to certain formulas of this invention at levels of from about 3%w. to about 8%w. Alkali metal, preferably potassium or sodium, silicates having a weight ratio of $SiO_2$:$M_2O$ of from 1:1 to 2.8:1 can be used. M in this ratio refers to sodium or potassium. A sodium silicate having a ratio of $SiO_2:Na_2O$ of about 1.6:1 to 2.45:1 is especially preferred for economy and effectiveness.

Hydrotropes can be added if desired to increase the compatibility of the ingredients of the formulations of this invention in lightly built systems. Preferred hydrotropes anions are benzene sulfonate, xylene sulfonate, and toluene sulfonate. They are preferably used as their soluble salts such as: ethanol-ammonium, diethanolammonium, and triethanolammonium, and especially as the alkali metal, potassium, or sodium salts. Sodium or potassium toluene sulfonate is especially preferred. The hydrotrope is added at levels of up to about 10%w. Levels of from about 2%w. to 8%w. are preferred. The upper limit of about 10%w. is set by increasing dilution of the product by an ingredient substantially inert so far as sudsing and detergency are concerned. The lower limit is the amount required to achieve a homogeneous solution. It will be appreciated that it is necessary that the formulations of this invention should be liquid at somewhat higher and at somewhat lower temperatures than usual room temperature. The amount of hydrotrope salt used is preferably the minimum amount which will hold the ingredients in solution at the temperature to which it is desired that the formula can be cooled without phase separation.

As mentioned previously solubility agents also can be added, if necessary, and those preferred are lower alcohols such as methyl, ethyl and propyl alcohols. They are generally employed at a level of up to about 25% by weight of the composition and preferably between about 5% to 15% by weight.

Various minor ingredients can also be added to the compositions of the present invention. Such normal and desirable additives include perfumes, viscosity control agents, opacifiers, and pigments. In addition, inert materials such as water-soluble inorganic salts can also be present in minor amounts, generally as impurities from the various ingredients or as opacifier stabilizers. For example, ethylene glycol distearate or polystyrene can be used as opacifiers in amounts of up to 3% by weight of the composition.

ILLUSTRATIVE EMBODIMENT 1

A 5 g. sample of 25%w. acetyl peroxide in dimethyl phthalate was added to a solution of 25 g. maleic anhydride and 5 ml. of isopropyl acetate contained in a glass reactor maintained at 75° C. and under an atmosphere of nitrogen. The resulting reaction mixture was kept at 75° C. for 3 hours and then at 100° C. for another 3 hours. The reaction mixture was then cooled and poured into about 1.5 liters of toluene. The telomer product mixture precipitated as a fine violet red powder. The precipitated telomer product mixture was washed with toluene and dried in an oven maintained at 65° C. A 19.5 g. sample of the isopropyl acetate/maleic anhydride product telomer was obtained (78% conversion of maleic anhydride).

Vapor pressure osmometric molecular weight determination on the telomer product gave a number average molecular weight of 1000.

A portion of the telomer product was dissolved in water and neutralized to pH 10 with sodium hydroxide solution. The solution was heated on a steam bath for about one hour. Sufficient sodium hydroxide was then added to adjust the pH of the solution to 10. The solution was then evaporated to dryness on a steam bath to give the pale yellow hydroxypropyl/sodium polycarboxylate telomer as a dry powder.

ILLUSTRATIVE EMBODIMENT 2

A 5 g. sample of 25%w. acetyl peroxide in dimethyl phthalate was added to a solution of 25 g. maleic anhydride, 5 ml. of isopropyl acetate and 100 ml. of benzene contained in a glass reactor maintained at 75° C. and under an atmosphere of nitrogen. The resulting reaction mixture was maintained at 75-84° C. for 6 hours during which time the telomer product precipitated. The telomer product was filtered, washed with toluene and dried. A 11.8 g. sample of isopropyl acetate/maleic anhydride telomer product was obtained. The number-average molecular weight was 537 (vapor pressure osmometry) and weight-average molecular weight was 1570 (ultracentrifuge).

The number-average molecular weight of the telomer product determined by vapor pressure osmometry is sensitive to the number of molecules present and not to their masses. The weight-average molecular weight of the telomer product determined by ultra-centrifuge is sensitive to the mass of a molecule and not to the number of molecules. A telomer produced with a number-average molecular weight of 537 and a weight-average molecular weight of 1570 has a broad molecular weight distribution with molecules of molecular weight lower than 537 and higher than 1570. If only one molecular weight species was present the same value would be obtained by either method of molecular weight determination.

By a procedure identical to that described in Illustrative Embodiment 1, a portion of the telomer product was converted to the hydroxypropyl/sodium polycarboxylate salt.

ILLUSTRATIVE EMBODIMENT 3

A mixture of 25 g. maleic anhydride, 25 ml. of propylene carbonate, 5 g. of 25%w. acetyl peroxide in dimethyl phthalate and 100 ml. of benzene was reacted at 75-85° C. for 6 hours by a procedure identical to that described in Illustrative Embodiment 2. A 19.5 g. sample of propylene carbonate/maleic anhydride telomer product having a number-average molecular weight of 368 (vapor pressure osmometry).

By a procedure identical to that described in Illustrative Embodiment 1, the telomer was converted to a sodium polycarboxylate telomer product having a dihydroxypropyl group. The presence of the vic-glycol group in the telomer was confirmed by a positive periodic acid test. The molecular weight as determined from the vic-glycol analysis was 1008 (calculated as the anhydride form).

ILLUSTRATIVE EMBODIMENT 4

A mixture of 2.93 g. of 2,3-$^{14}$C-maleic anhydride, 0.6 ml. of methyl isobutyl ketone and 0.6 g. of 25% w. acetyl peroxide in dimethyl phthalate was reacted at 75-100° C. for 6 hours by a procedure similar to that described in Illustrative Embodiment 1. A 2.18-g. sample of methyl isobutyl ketone/maleic anhydride telomer having a number-average molecular weight of 868 (vapor pressure osmometry) and a radioactivity count of 18.19$\mu$ C/g. was obtained. The presence of a methyl ketone functional group in the telomer was confirmed by a positive iodoform test.

By a procedure identical to that described in Illustrative Embodiment 1, the methyl isobutyl ketone/maleic anhydride telomer was converted to the methyl isobutyl ketone/sodium polycarboxylate telomer.

ILLUSTRATIVE EMBODIMENT 5

A mixture of 10.14 g. of 2,3-$^{14}$C-maleic anhydride, 20 g. of methyl ethyl ketone (2-butanone), 2 g. of 25%w. acetyl peroxide in dimethyl phthalate was reacted at 75-91° C. for 6 hours by a procedure identical to that described in Illustrative Embodiment 1. A 4.0 g. sample of methyl ethyl ketone/maleic anhydride telomer having a number-average molecular weight of 710-840 (vapor pressure osmometry) was obtained.

By a procedure identical to that described in Illustrative Embodiment 1, the methyl ethyl ketone/maleic anhydride telomer was converted to the methyl ethyl ketone/sodium polycarboxylate telomer having a radioactivity count of 13.3 μC/g.

ILLUSTRATIVE EMBODIMENT 6

A 5 g. sample of 25% w. acetyl peroxide in dimethyl phthalate was added to a solution of 25 g. of maleic anhydride and 25 ml. of diethyl malonate in 100 ml. of benzene contained in a glass reactor maintained at 75° C. and under an atmosphere of nitrogen. The resulting reaction mixture was kept at 75° C. for 3 hours and then at 86° C. for another 3 hours. The reaction mixture was then cooled and poured into about 1.5 liters of toluene. The telomer product mixture precipitated as a fine violet red powder. The precipitated telomer product mixture was washed with toluene and dried in an oven maintained at 65° C. A 19.5 g. sample of telomer diethyl malonate/maleic anhydride product was obtained (78% conversion of maleic anhydride).

Vapor pressure osmometric molecular weight determination on the telomer product gave a number-average molecular weight of 400. Ultra-centrifuge molecular weight determination gave a weight-average molecular number of 2270.

A portion of the telomer product was dissolved in water and neutralized to pH 10 with sodium hydroxide solution. The solution was heated on a steam bath for about one hour. Sufficient sodium hydroxide was then added to adjust the pH of the solution to 10. The solution was then evaporated to dryness on a steam bath to give the pale yellow dicarboxylate/sodium polycarboxylate telomer as a dry powder.

ILLUSTRATIVE EMBODIMENT 7

The $Ca^{++}$ sequestering ability of the novel water-soluble polycarboxylate telomer builders prepared as described in Illustrative Embodiments 1–6 was determined by the titration of the telomer with calcium nitrate in the presence of oxalic acid using the nephelometric method disclosed by Irani and Callis, J. Phys. Chem., 64, 1398 (1960) and J.A.O.C.S., 39, 156 (1962). For comparison, the $Ca^{++}$ sequestering abilities of sodium tripolyphosphate as well as several widely used sodium tripolyphosphate replacements were determined. The results are provided in Table I. The polycarboxylate telomer molecular weights reported in the table are number-average molecular weights of the anhydride form.

TABLE I

Comparative sequestering ability

| Builder: | Sequestering ability, g. $Ca^{++}$/100 g. |
|---|---|
| Sodium metasilicate | 1 |
| Citric acid | 1 |
| Tetrasodium pyrophosphate | 4.6 |
| Sodium tripolyphosphate | 9.4 |
| Nitrilotriacetic acid | 12.4 |
| Hydroxypropyl/sodium polycarboxylate (mole wt. 527) | 9.4 |
| Hydroxypropyl/sodium polycarboxylate (mole wt. 1000) | 13.8 |
| Dihydroxy/sodium polycarboxylate (mole wt. 368) | 12.2 |
| Methyl isobutyl ketone/sodium polycarboxylate (mole wt. 827) | 11.8 |
| Methyl isobutyl ketone/sodium polycarboxylate mole wt. 468) | 8.6 |
| Methyl ethyl ketone/sodium polycarboxylate (mole wt. 539) | 10.3 |
| Dicarboxylate/sodium polycarboxylate (mole wt. 400) | 11.4 |

ANALYTICAL TECHNIQUE 1

The biodegradability of a sample of the dihydroxyalkyl/sodium polycarboxylate telomer prepared in Illustrative Embodiment 3 was determined using the Soap and Detergent Associations (SDA) Biodegradation Test Method reported in McCutcheon's Detergents and Emulsifiers, 1967 Annual, pp. 129–138.

The biotreater and test procedure were essentially identical to the SDA Biodegradation Test Method except that the test procedure was shortened to two days acclimation and from three to five days level operation. Fresh sludge from the city of San Ramon, Calif., activated sewage plant was employed. The synthetic sewage solution employed consisted of 130 p.p.m. glucose, 130 p.p.m. nutrient broth, 130 p.p.m. beef extract, 130 p.p.m. $K_2HPO_4$ and 25 p.p.m. $(NH_4)_2SO_4$.

The biotreater was charged with 1 liter of fresh sludge and sufficient tap water (about 500 ml.) to give a suspension having 2000–3000 milligrams per liter of suspended solids (sludge volume index) and maintained at a temperature of 25° C.

After one day of acclimation and after settling, 1 liter of supernatant was removed from the biotreater and replaced with one liter of the synthetic sewage containing 10 p.p.m. of the polycarboxylate telomer and after the second day of acclimation, 1 liter of supernatant was removed from the biotreater and replaced with one liter of the synthetic sewage containing 20 p.p.m. of the polycarboxylate telomer. During the periods of level operation, one liter of supernatant liquid was removed each day from the biotreater and was replaced with one liter of the synthetic sewage containing 20 p.p.m. of the polycarboxylate telomer.

The supernatant liquids removed from the biotreater during the periods of level operation were analyzed for the undergraded telomer using the Magnesium-Eriochrome Black T-Spectrophotometric Color Test described in Analytical Technique 2. The color test showed an average of 2 p.p.m. of undegraded polycarboxylate telomer in the supernatant liquid during the periods of level operation which amount corresponds to a 90% biodegradation of the polycarboxylate telomer, based on the daily charge of 20 p.p.m. telomer to the biotreater during the periods of level operation.

The percent biodegradation refers to the percent reduction of the polycarboxylate telomer from the supernatant liquid. It is appreciated, of course, that the supernatant liquid from the laboratory biotreater corresponds to the effluent stream from an actual activated sewage plant.

During operation of the biotreater, the sewage sludge remained as a fine suspension of solids.

ANALYTICAL TECHNIQUE 2

Determination of polycarboxylate telomers in supernatants from activated sludge biodegradations: Magnesium-Eriochrome Black T-Spectrophotomeric Method Method summary.—A measured volume of the supernatant from a biodegradation experiment is passed through a column of cation exchange resin in the sodium form to remove metal ions and replace them with sodium. The column is washed and the combined effluent and washings diluted to a fixed volume with deionized water. A measured volume of the solution from ion exchange then is mixed with a measured volume of an aqueous solution of Mg-Eriochrome Black T reagent at pH 10. The polycarboxylate telomer selectively chelates the magnesium ion and liberates the blue Eriochrome Black T. The absorbance of the solution at 638 mμ (that of the Eriochrome Black T) is measured using a spectrophotometer. The net absorbance of the solution over that of a blank is converted to micrograms of polycarboxylate telomer by reference to a calibration curve prepared from known amounts of the *same* polycarboxylate telomer.

Apparatus (a) Ion-exchange column, 14 mm. O.D. ×10 cm. long, with stopcock, drip tip and a 19/22 outer joint.
(b) Funnel, with 19/22 inner joint, 120 ml. capacity.
(c) Flask, volumetric, 100 ml., polypropylene.
(d) Cylinders, 100 ml., graduated, plastic.
(e) Cuvette, 5 cm. light path.
(f) Spectrophotometer.

Reagents (a) Magnesium solution, 0.01 M, dissolve 0.2465 g. $MgSO_4 \cdot 7H_2O$ in one liter of water.
(b) Buffer solution, pH 10, add 67.5 g. of ammonium chloride to 570 ml. of ammonium hydroxide in a one liter volumetric flask. Dilute to one liter with water. Shake until the ammonium chloride is dissolved. Store in a plastic bottle.
(c) Magnesium-Eriochrome Black T reagent, place 0.0114 g. of Eriochrome Black T [sodium 1-(1-hydroxy-2-naphthylazo)-6-nitro-2-naphthol-4-sulfonate] in a one-liter plastic bottle. Add 500 ml. of water and 100 ml. of pH 10 buffer solution. Shake until the Eriochrome Black T is dissolved. Add 2.00 ml. of the magnesium solution. Dilute to one liter with water and mix thoroughly. Prepare fresh daily.
(d) Polycarboxylate telomer standard solution, 100 p.p.m., place 100 mg. of the polycarboxylate telomer to be tested in a 100 ml. plastic volumetric flask, dissolve in deionized water, dilute to the mark and mix thoroughly.
(e) Cation exchanger resin, AG 50W–X4, 50–100 mesh, sodium form. Available form Bio-Rad Laboratories, Richmond, Calif.

Procedure

Ion exchange.—Attach the funnel to the ion exchange column, close the stopcock, and add deionized water to fill the column. Add sufficient resin to give a resin bed 10 cm. in height (approximately 10 cc.). Add water to the funnel, open the stopcock and allow water to drip through the column at the rate of 1–2 ml. per minute. Wash the funnel and column with an additional 50 ml. of deionized water and force the liquid to the top of the resin using a rubber bulb. Place a 100 ml. plastic volumetric flask to catch the effluent from the column. Close the stopcock and add 80 ml. of well mixed supernatant liquid from the biodegradation to the funnel and column. Open the stopcock and allow the liquid to flow at the rate indicated. When flow stops, force the liquid standing above the resin to the top of the resin with a rubber bulb. Wash down the funnel with a stream of deionized water from a wash bottle and force the washings into the resin. Repeat the washing step two additional times. Add deionized water and continue to collect effluent until the liquid in the flask is at the mark. Stopper and mix the contents of the flask.

Calibration.—Into 100 ml. plastic graduated cylinders pipet sufficient polycarboxylate telomer solution to give 100, 300, 500, 600 micrograms of polymaleate. Dilute to 50 ml. with water. Add 50 ml. of water to a plastic cylinder to serve as a blank. To all of the graduated cylinders add 50 ml. of the magnesium-Eriochrome Black T reagent. Mix thoroughly and after 5 minutes read the absorbance of each solution at 638 m$\mu$. Using a 5 cm. cell and air as the reference, substract the absorbance of the blank from each of the other absorbances and make a plot of these differences versus milligrams of polycarboxylate telomer.

Color development.—Place a measured volume of sample solution containing 100 to 600 micrograms of polycarboxylate telomer into a 50 ml. plastic graduated cylinder. Do not use more than 50 ml. of sample. Dilute to 50 ml. with water. Prepare a blank using 50 ml. of water. Add 50 ml. of the Magnesium-Eriochrome Black T reagent, mix thoroughly and after 5 minutes read the absorbances of the solutions at 638 m$\mu$. Substract the absorbance of the blank from the sample absorbance and obtain the amount of polycarboxylate telomer present from the calibration curve.

Calculations.—Calculate the concentration of polycarboxylic telomer in the effluent sample as follows:

Telomer, $$\text{P.p.m.} = \frac{(A)}{V} \times \frac{100}{(80)}$$

where

A=micrograms of sample obtained from the calibration curve.
V=volume of sample taken for color development.

Accuracy and precision

The accuracy and precision of the method is approximately ±10%.

ILLUSTRATIVE EMBODIMENT 8

The biodegradability of a sample of the dicarboxylate/sodium polycarboxylate telomer (molecular weight 400, anhydride form) prepared in Illustrative Embodiment 6 was determined using the procedure described in Analytical Technique 1.

The supernatant liquids removed from the biotreater during the periods of level operation were analyzed for the undergraded telomer using the Magnesium-Erichrome Black T-Spectrophotometric Color Test described in Analytical Technique 2. The color test showed an average of 4 p.p.m. undegraded polycarboxylate telomer in the supernatant liquid during the first two days of level operation which amount corresponds to an 80% biodegradation of the polycarboxylic telomer, based on the daily charge of 20 p.p.m. telomer to the biotreater during the periods of level operation.

ILLUSTRATIVE EMBODIMENT 9

The biodegradability of a sample of the methyl isobutyl ketone/sodium polycarboxylate telomer polymer prepared in Illustrative Embodiment 4 was determined using the procedure described in Analytical Technique 1.

The supernatant liquid removed from the biotreater during the periods of level operation were analyzed for the undergraded telomer using the Magnesium-Eriochrome Black T-Spectrophotometric Color Test described in Analytical Technique 2. After the fifth day of operation, the color test showed 5 p.p.m. undegraded polycarboxylic telomer in the supernatant liquid which amount corresponds to a 75% biodegradation of the polycarboxylate telomer, based on the 20 p.p.m. telomer charged to the biotreater.

ILLUSTRATIVE EMBODIMENT 10

The detergent compositions of the invention were tested in fabric detergency tests using radiolabeled sebum and clay soils. For comparison, a sodium tripolyphosphate (STPP) built detergent composition as well as several detergent compositions containing widely used builders were also tested. The detergent formulation details are provided in Table II. The washing conditions are provided in Table III. The results for soil removal from cotton are provided in Table III and the results for soil removal from permanent press Dacron/cotton are provided in Table IV. In the Tables Neodol® 25–9 Detergent Alcohol Ethoxylate refers to an alcohol ethoxylate surfactant marketed by the Shell Chemical Company, Ucane 13–S refers to a linear soduim alkylbenzenesulfonate prepared by sulfating linear alkylbenzenes (Ucane 13) marketed by Union Carbide, NTA refers to nitrilotriacetic acid, STM refers to methyl isobutyl ketone/sodium polycarboxylate telomer, and the molecular weights of the STM telomers are the number-average molecular weight of the anhydride form.

TABLE I

Formulation Details

| Formulation: | Percent w. |
|---|---|
| Surfactant | 15 |
| Sodium silicate | 7 |
| Sodium carboxymethyl cellulose | 1 |
| Sodium sulfate | 37 |
| Builder | 40 |

| Builder candidates: | |
|---|---|
| (1) STPP | 40 |
| (2) $NTA \cdot H_2O$ | 25 |
| Sodium carbonate | 5 |
| Sodium sulfate | 10 |
| (3) Sodium citrate $\cdot 2H_2O$ | 40 |
| (4) Sodium carbonate | 40 |
| (5) Sodium sulfate | 40 |
| (6) STM, 428 mol wt. | 40 |
| (7) STM, 540 mol wt. | 40 |
| (8) STM, 827 mol wt. | 40 |

TABLE III.—WASHING CONDITIONS

Tagged Clay (4–5 mg. per fabric swatch) Irradiated and purified kaolinite clay marketed by the H. C. Spinks Clay Company as "Bandy Black Research Clay"

| Doubly Labeled Sebum (28 mg. per fabric swatch): | Percent w. | Label |
|---|---|---|
| Lubricating oil | 25 | $^3H$ |
| Tristearin | 10 | $^3H$ |
| Arachis oil | 20 | |
| Stearic acid | 15 | $^{14}C$ |
| Oleic acid | 15 | $^{14}H$ |
| Octadecanol | 8 | $^{14}C$ |
| Cholesterol | 7 | $^{14}C$ |

Fabrics:
- Cotton
- Permanent press dacron/cotton

Tergotometer conditions:
- Agitation: 100 cycles/min. for 10 min.
- Volume: 500 ml.
- Fabric load: 4–10 cm. square swatches of a given type.
- Rinse: By hand in 105 ml. distilled water.
- Temperature: 120° F.
- Water hardness (60/40 Ca/Mg ratio): 150 and 300 p.p.m.
- Detergent concentration: 0.15%.

TABLE IV.—SOIL REMOVAL FROM COTTON

Minimum significant difference, 95% confidence level $^3H=5.0$, $^{14}C=5.2$ Clay=6.6

| | | Soil removed, percent | | | | | |
|---|---|---|---|---|---|---|---|
| | | Water hardness 150 p.p.m. | | | Water hardness 300 p.p.m. | | |
| Surfactant | Builder | $^3H$ | $^{14}C$ | Clay | $^3H$ | $^{14}C$ | Clay |
| Neodol® 25-9 detergent alcohol ethoxylate. | STPP | 59 | 72 | 47 | 59 | 64 | 44 |
| | NTA | 52 | 68 | 42 | 56 | 60 | 41 |
| | Sod. citrate | 60 | 65 | 43 | 57 | 60 | 41 |
| | Sod. carbonate | 61 | 72 | 39 | 56 | 64 | 33 |
| | Sod. sulfate | 59 | 63 | 39 | 58 | 61 | 38 |
| | STM 428 MW | 61 | 69 | 44 | 59 | 64 | 43 |
| | STM 520 MW | 61 | 67 | 45 | 60 | 65 | 43 |
| | STM 827 MW | 64 | 83 | 46 | 57 | 65 | 41 |
| Ucane 13-S | STPP | 61 | 71 | 47 | 41 | 48 | 35 |
| | NTA | 49 | 58 | 37 | 23 | 29 | 20 |
| | Sod. citrate | 45 | 51 | 36 | 31 | 37 | 22 |
| | Sod. carbonate | 35 | 46 | 28 | 27 | 33 | 19 |
| | Sod. sulfate | 32 | 37 | 25 | 17 | 21 | 17 |
| | STM 428 MW | 51 | 60 | 43 | 27 | 34 | 22 |
| | STM 540 MW | 61 | 73 | 44 | 35 | 42 | 29 |
| | STM 827 MW | 62 | 77 | 43 | 35 | 42 | 26 |

TABLE V.—SOIL REMOVAL FROM PERMANENT PRESS DACRON/COTTON

Minimum significant difference, 95% confidence level $^3H=5.0$, $^{14}C=5.2$ Clay=6.6

| | | Soil removed, percent | | | | | |
|---|---|---|---|---|---|---|---|
| | | Water hardness 150 p.p.m. | | | Water hardness 300 p.p.m. | | |
| Surfactant | Builder | $^3H$ | $^{14}C$ | Clay | $^3H$ | $^{14}C$ | Clay |
| Neodol® 25-9 detergent alcohol ethoxylate. | STPP | 54 | 74 | 69 | 42 | 60 | 60 |
| | NTA | 42 | 65 | 61 | 39 | 59 | 57 |
| | Sod. citrate | 45 | 63 | 63 | 38 | 58 | 57 |
| | Sod. carbonate | 37 | 59 | 59 | 38 | 61 | 58 |
| | Sod. sulfate | 40 | 59 | 58 | 40 | 60 | 55 |
| | STM 428 MW | 45 | 66 | 62 | 41 | 60 | 59 |
| | STM 540 MW | 48 | 73 | 65 | 41 | 61 | 56 |
| | STM 827 MW | 51 | 77 | 68 | 42 | 66 | 61 |
| Ucane 13-S | STPP | 46 | 70 | 67 | 26 | 49 | 52 |
| | NTA | 30 | 56 | 57 | 20 | 40 | 32 |
| | Sod. citrate | 30 | 55 | 55 | 20 | 40 | 36 |
| | Sod. carbonate | 25 | 49 | 48 | 21 | 39 | 35 |
| | Sod. sulfate | 20 | 39 | 35 | 13 | 27 | 27 |
| | STM 428 MW | 35 | 61 | 58 | 20 | 40 | 36 |
| | STM 540 MW | 43 | 69 | 64 | 25 | 48 | 45 |
| | STM 827 MW | 49 | 76 | 64 | 26 | 54 | 44 |

ILLUSTRATIVE EMBODIMENT 11

A biodegradable detergent composition having a water-soluble polycarboxylate telomer as a builder material is of the following composition:

| Component: | Percent w. |
|---|---|
| Neodol® 25-9 detergent alcohol ethoxylate (marketed by the Shell Chemical Co.) | 15 |
| Sodium silicate | 7 |
| Sodium carboxymethyl cellulose | 1 |
| Sodium sulfate | 37 |
| Dicarboxylate/sodium polycarboxylate of illustrative Embodiment 6 | 40 |

ILLUSTRATIVE EMBODIMENT 12

A biodegradable detergent composition having a water-soluble polycarboxylate telomer as a builder material is of the following composition:

| Component: | Percent w. |
|---|---|
| Neodol® 25-9 detergent alcohol ethoxylate (marketed by the Shell Chemical Co.) | 15 |
| Sodium silicate | 7 |
| Sodium carboxymethyl cellulose | 1 |
| Sodium sulfate | 37 |
| Dihydroxypropyl/sodium polycarboxylate of Illustrative Embodiment 3 | 40 |

ILLUSTRATIVE EMBODIMENT 13

A detergent composition consists of the following components:

| Components: | Percent w. |
|---|---|
| Condensation product of 10 moles of ethylene oxide and one mole of tallow fatty alcohol | 20 |
| Sodium n-tridecylbenzene sulfonate | 10 |
| Dedecyldimethyl phosphine oxide | 5 |
| Coconut oil soap | 15 |
| Dicarboxylate/sodium polycarboxylate telomer of Illustrative Embodiment 6 | 50 |

ILLUSTRATIVE EMBODIMENT 14

A built granular detergent composition consists of the following components:

| Component: | Percent w. |
|---|---|
| 3(N,N - dimethyl-N-dodecylammonio)-2 hydroxypropane-1-sulfonate | 6.0 |
| Sodium tallow alcohol sulfate | 10 |
| Methyl isobutyl ketone/sodium polycarboxylate telomer (800 MW) | 40 |
| Sodium sulfate | 8 |
| Sodium silicate | 11 |
| Water | 11 |

ILLUSTRATIVE EMBODIMENT 15

A built liquid detergent composition consists of the following components:

| Component: | Percent w. |
|---|---|
| Sodium salt of sulfonated $C_{14}$–$C_{20}$ alpha-olefins (by process of U.S. 3,488,384) | 10 |
| Sodium coconut alkyl glyceryl ether sulfonate | 2.5 |
| Coconut monoethanolamide | 2.5 |
| Dihydroxybutyl/sodium polycarboxylate telomer (500 MW) | 2.5 |
| Potassium toluene sulfonate | 10 |
| Water | 50 |

ILLUSTRATIVE EMBODIMENT 16

A biodegradable granular detergent composition consists of the following component:

| Component: | Percent w. |
|---|---|
| Sodium salt of sulfonated 1-hexadecene (by process of U.S. Pat. 3,488,384) | 17.5 |
| Dihydroxypropyl/sodium polycarboxylate telomer (300 MW) | 50 |
| Sodium sulfate | 23 |
| Sodium silicate | 6 |
| Water | 3.5 |

ILLUSTRATIVE EMBODIMENT 17

A built granular detergent composition consists of the following components:

| Component: | Percent w. |
|---|---|
| 3 - (N,N - dimethyl - N-hexadecylammonio)-propane - 1 - sulfonate | 17 |
| Dihydroxybutyl/sodium polycarboxylate telomer (800 MW) | 45 |
| Sodium silicate ($SiO_2$:$Na_2$=2.51) | 6.0 |
| Sodium carboxymethylcellulose | .5 |
| Sodium sulfate | 28.5 |
| Water | 3.5 |

ILLUSTRATIVE EMBODIMENT 18

A built liquor detergent composition consists of the following components:

| Component: | Percent w. |
|---|---|
| 3-(N,N - dimethyl - N - coconutammonio)-2-hydroxypropane - 1 - sulfonate | 12 |
| Methyl ethyl ketone/potassium polycarboxylate (600 MW) | 20 |
| Potassium hydroxide | 5.8 |
| Sodium silicate ($SiO_2$:$Na_2O$=1.6:1) | 3.8 |
| Potassium toluene sulfonate | 8.5 |
| Sodium carboxymethyl hydroxyethyl cellulose | .3 |
| Fluorescent dye | .12 |
| Perfume | .15 |
| Benzotriazole | .02 |
| Water | 49.31 |

ILLUSTRATIVE EMBODIMENT 19

A detergent composition consists of the following component:

| Component: | Percent w. |
|---|---|
| 3 - (N,N - dimethyl - N - dodecylammonio)-2-hydroxypropane - 1 sufonate | 25 |
| Hydroxypropyl/sodium polycarboxylate telomer (560 MW) | 25 |
| Sodium sulfate | 30 |
| Sodium silicate | 20 |

ILLUSTRATIVE EMBODIMENT 20

A liquid built detergent composition consists of the following components:

| Component: | Percent w. |
|---|---|
| Sodium n-dodecylbenzenesulfonate | 6 |
| Dimethyldodecylamine oxide | 6 |
| Sodium polycarboxylate telomer (400 MW) prepared from an ethyl acetoacetate/maleic anhydride telomer | 20 |
| Potassium toluenesulfonate | 8 |
| Sodium silicate | 3.8 |
| Carboxymethyl hydroxyethyl cellulose | 0.3 |
| Water | Balance |

ILLUSTRATIVE EMBODIMENT 21

A detergent composition consists of the following components:

| Component: | Percent w. |
|---|---|
| Sodium dodecylbenzene sulfonate (dodecyl group being a linear aliphatic radical) | 20 |
| Potassium toluene sulfonate | 2 |
| Trichlorocarbonide | 0.7 |
| Acetylacetone/sodium polycarboxylate telomer (700 MW) | 33 |
| Sodium silicate | 6 |
| Sodium sulfate | 32.6 |
| Water | 6.0 |

ILLUSTRATIVE EMBODIMENT 22

The detergent compositions of the invention were tested in fabric detergency tests using commercial solided cotton test swatches. For comparison, detergent compositions containing sodium tripolyphosphate (STPP) or a variety of other builder materials were also tested. The detergent formulation details are provided in Table VI. The tergotometer conditions are provided in Table VII. The results for soil removal for a cotton test cloth (UST Cloth) marketed by United States Testing are provided in Table VIII. The results for solid removal for a cotton test cloth (TFI Cloth, manufactured according to Specification 51S47–INT of the Bureau of Ships) marketed by Testfabrics Inc., are provided in Table IX. The results for soil removal for a cotton test cloth (EMPA 101 Cotton Test Cloth) marketed by Testfabrics Inc., are provided in Table X. The average soil removal from the three test cloths (UST, TFI and EMPA) are provided in Table XI.

The soil removal values reported in Tables VIII–XI are relative to a reference formulation of 20%w. linear alkylbenzene sulfonate, 40%w. STPP, 7% sodium silicate, 32% sodium sulfate and 1% sodium carboxymethyl cellulose, which formulation is assigned a solid removal value of 100.

TABLE VI

Formulation details

| Formulation: | Percent w. |
|---|---|
| Surfactant | 10–20 |
| Builder | 40 |
| Sodium carboxymethyl cellulose | 1 |
| Sodium silicate | 7 |
| Sodium sulfate | 42–32 |
| Builder candidates: | |
| Sodium tripolyphosphate (STPP) | 40 |
| Sodium carbonate | 40 |
| Trisodium sulfosuccinate | 40 |
| Sodium sulfate | 82–72 |
| Dihydroxypropyl/sodium polycarboxylate (produced in Illustrative Embodiment 3 and re-referred to as "Carboxylate Telomer") | 40 |

Surfactant candidates:

$C_{16}$–$C_{18}$ alpha-olefin sulfonate _____ 20
$C_{12}$–$C_{15}$ alcohol ethoxylate (Neodol® 25-9 detergent alcohol ethoxylate) _____ 15
3 - (N,N - dimethyl-N-laurylammonio)propane-1-sulfonate [sulfobetaine]) _____ 15
Soap (Ivory flakes, marketed by Procter and Gamble) _____ 15
$C_{14}$–$C_{15}$ alcohol ethoxysulfate (Neodol® 45-3S detergent alcohol ethoxysulfate marketed by Shell Chemical Co.) _____ 20

TABLE VII

Tergotometer conditions

Agitation _____ 100 cycles/min. for 10 min.
Volume _____ 500 mls.
Fabric load _____ 10 cm. square swatches of a given type (4-runs).
Rinse _____ By hand in tap water.
Temperature _____ 120° F.
Water hardness (60/40 Ca/Mg ratio) _____ 150 p.p.m.
Detergent formulation conc. _____ 1.5 g./l.

TABLE VIII.—SOIL REMOVAL FROM UST CLOTH

| Surfactant | Carboxylate telomer | STPP | Na₂CO₃ | Na₂SO₄ | Sulfosuccinate |
|---|---|---|---|---|---|
| Alpha-olefin sulfonate | 88 | 91 | 84 | 106 | 99 |
| Alcohol ethoxy sulfate | 81 | 80 | 75 | 75 | 78 |
| Sulfobetaine | 70 | 74 | 60 | 45 | 50 |
| Soap | 70 | 31 | 22 | 7 | 9 |
| Alcohol ethoxylate | 112 | 100 | 92 | 85 | 87 |

TABLE IX.—SOIL REMOVAL FROM TFI CLOTH

| Surfactant | Carboxylate telomer | STPP | Na₂CO₃ | Na₂SO₄ | Sulfosuccinate |
|---|---|---|---|---|---|
| Alpha-olefin sulfonate | 97 | 85 | 84 | 79 | 89 |
| Alcohol ethoxy sulfate | 84 | 72 | 72 | 67 | 73 |
| Sulfobetaine | 76 | 75 | 72 | 61 | 63 |
| Soap | 88 | 69 | 42 | 38 | 38 |
| Alcohol ethoxylate | 81 | 75 | 77 | 69 | 73 |

TABLE X.—SOIL REMOVAL FROM EPMA 101 COTTON CLOTH

| Surfactant | Carboxylate telomer | STPP | Na₂CO₃ | Na₂SO₄ | Sulfosuccinate |
|---|---|---|---|---|---|
| Alpha-olefin sulfonate | 96 | 95 | 80 | 66 | 69 |
| Alcohol ethoxy sulfate | 94 | 85 | 78 | 36 | 39 |
| Sulfobetaine | 98 | 95 | 94 | 55 | 65 |
| Soap | 95 | 80 | 40 | 28 | 28 |
| Alcohol ethoxylate | 97 | 93 | 85 | 37 | 40 |

TABLE XI.—AVERAGE SOIL REMOVAL FROM UST CLOTH TFI CLOTH AND EMPA 101 COTTON TEST CLOTH

| Surfactant | Carboxylate telomer | STPP | Na₂CO₃ | Na₂SO₄ | Sulfosuccinate |
|---|---|---|---|---|---|
| Alpha-olefin sulfonate | 94 | 90 | 83 | 84 | 86 |
| Alcohol ethoxy sulfate | 86 | 79 | 75 | 59 | 63 |
| Sulfobetaine | 81 | 81 | 75 | 54 | 59 |
| Soap | 85 | 60 | 35 | 24 | 25 |
| Alcohol ethoxylate | 97 | 89 | 85 | 63 | 67 |

We claim as our invention:

1. A cleansing and laundering composition consisting essentially of
  (1) an organic water-soluble, substantially biodegradable detergent surfactant selected from the group consisting of anionic, nonionic, zwitterionic, and ampholytic detergent surfactants and mixtures thereof, and
  (2) a water-soluble, substantially biodegradable polycarboxylate telomer builder represented by the formula

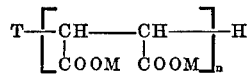

wherein M is ammonium or an alkali metal; $n$ is a whole number from 2 to 40; and T is an oxygenated end group selected from (a) $(A')(R)CH—(A)C(R)—$, (b) 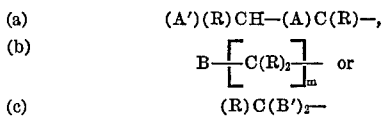

(c) $(R)C(B')_2—$ wherein $m$ is one or two; R independently is hydrogen or alkyl of 1 to 4 carbon atoms and free from quaternary carbon atoms; A is hydroxy; A' is A or hydrogen; B is alkanoyl of 2 to 6 carbon atoms; and B' is B or —COOM, with the proviso that the telomer builder has a number-average molecular weight, calculated as the acid form, of less than 1200 and a Ca sequestering ability of from 1 to 15 g. $Ca^{++}$/100 g., and with the further proviso that the ratio of the telomer builder to detergent surfactant is in the range of about 1:3 to 10:1, by weight.

2. The composition of claim 1 wherein the T end group of the telomer builder is free from quaternary carbon atoms.

3. The composition of claim 2 wherein the ratio of the telomer builder to the detergent surfactant is from about 1:2 to 5:1, by weight; and the molecular weight of the telomer builder is from about 300 to 1000.

4. The composition of claim 2 which provides in aqueous solution a pH of from about 8.5 to 12 and the molecular weight of the telomer builder is from 300 to 1000.

5. The composition of claim 2 wherein the ratio of the telomer builder to the detergent surfactant is from about 1:2 to 3:1, by weight, and the telomer builder has a Ca sequestering ability of from 3 to 12 g. $Ca^{++}$/100 g.

6. The composition of claim 1 comprising as a detergent surfactant an anionic alkali metal salt of a $C_{10}$–$C_{26}$ alpha-olefin sulfonate.

7. The composition of claim 6 wherein the alpha-olefin moiety of the alpha olefin sulfonate is linear and has from 10 to 20 carbon atoms.

8. The composition of claim 7 wherein the T group is $(A')(R)CH—(A)C(R)—$ and R is n-alkyl.

9. The composition of claim 8 wherein the A' group is hydroxy.

10. The composition of claim 9 wherein the weight ratio of the telomer builder to the detergent surfactant is from about 1:2 to 5:1, the molecular weight of the telomer builder is from about 300 to 1000, the Ca sequestering ability of the telomer builder is 3 to 12 g. $C^{++}$/100 g. and the composition provides an aqueous solution of pH of from about 8.5 to 12.

11. The composition of claim 7 wherein the T group is $R(C)(B')_2$, B' is COOM and R is n-alkyl or hydrogen.

12. The composition of claim 11 wherein the weight ratio of the telomer builder to the detergent surfactant is from about 1:2 to 5:1, the molecular weight of the telomer builder is from about 300 to 1000, the Ca sequestering ability of the telomer builder is 3 to 12 g. $Ca^{++}$/100 g. and the composition provides an aqueous solution of pH of from about 8.5 to 12.

13. The composition of claim 1 comprising as a detergent surfactant an anionic alkali metal sulfuric acid ester of an alkyl ethoxylate containing from about 10 to 14 carbon atoms in the alkyl portion, and from 1 to 15 moles of ethylene oxide.

14. The composition of claim 13 wherein the alkyl group of the alkyl ethoxylate is at least 70% straight chain.

15. The composition of claim 14 wherein the T group is A'(R)CH—(A)C(R)— and R is n-alkyl.

16. The composition of claim 15 wherein the A' group is hydroxy.

17. The composition of claim 16 wherein the weight ratio of the telomer builder to the detergent surfactant is from about 1:2 to 5:1, the molecular weight of the telomer builder is from about 300 to 1000, the Ca sequestering ability of the telomer builder is 3 to 12 g. $Ca^{++}/100$ g. and the composition provides an aqueous solution of pH of from about 8.5 to 12.

18. The composition of claim 13 wherein the T group is $R(C)(B')_2$, B' is COOM and R is n-alkyl or hydrogen.

19. The composition of claim 11 wherein the weight ratio of the telomer builder to the detergent surfactant is from about 1:2 to 5:1, the molecular weight of the telomer builder is from about 300 to 1000, the Ga sequestering ability of the telomer builder is 3 to 12 g. $Ca^{++}/100$ g. and the composition provides an aqueous solution of pH of from about 8.5 to 12.

20. The composition of claim 1 comprising as a detergent surfactant a nonionic alcohol ethoxylate containing from about 10 to 15 carbon atoms in the alcohol moiety and from 1 to 15 moles of ethylene oxide.

21. The composition of claim 20 wherein the alcohol moiety is substantially linear.

22. The composition of claim 20 wherein the T group is A'(R)CH—(A)C(R)— and R is n-alkyl.

23. The composition of claim 22 wherein the A' group is hydroxy.

24. The composition of claim 23 wherein the weight ratio of the telomer builder to the detergent surfactant is from about 1:2 to 5:1, the molecular weight of the telomer builder is from about 300 to 1000, the Ca sequestering ability of the telomer builder is 3 to 12 g. $Ca^{++}/100$ g. and the composition provides an aqueous solution of pH of from about 8.5 to 12.

25. The composition of claim 20 wherein the T group is $R(C)(B')_2$— B' is COOM and R is n-alkyl or hydrogen.

26. The composition of claim 25 wherein the weight ratio of the telomer builder to the detergent surfactant is from about 1:2 to 5:1, the molecular weight of the telomer builder is from about 300 to 1000, the Ca sequestering ability of the telomer builder is 3 to 12 g. $Ca^{++}/100$ g. and the composition provides an aqueous solution of pH of from about 8.5 to 12.

27. The composition of claim 1 comprising as a detergent surfactant an alkylbenzene sulfonate wherein the alkyl group is linear and contains 10 to 20 carbon atoms.

28. An aqueous solution containing about 0.05%w. to 0.5%w. of the composition of claim 1 and having a pH of about 8.5 to 12.

References Cited

UNITED STATES PATENTS

| | | | |
|---|---|---|---|
| 3,308,067 | 3/1967 | Diehl | 252—550 XR |
| 2,628,238 | 2/1953 | Patrick | 260—346.8 R |
| 2,868,837 | 1/1959 | Burland et al. | 260—537 |
| 3,004,947 | 10/1961 | Dazzi | 260—31.8 |
| 3,474,114 | 10/1969 | Kuhlkamp et al. | 260—346.8 R |

LEON D. ROSDOL, Primary Examiner

P. E. WILLIS, Assistant Examiner

U.S. Cl. X.R.

252—132, 135, 554, 555, 558, DIG. 11